INVENTOR
Paul R. Grossman
BY
ATTORNEY

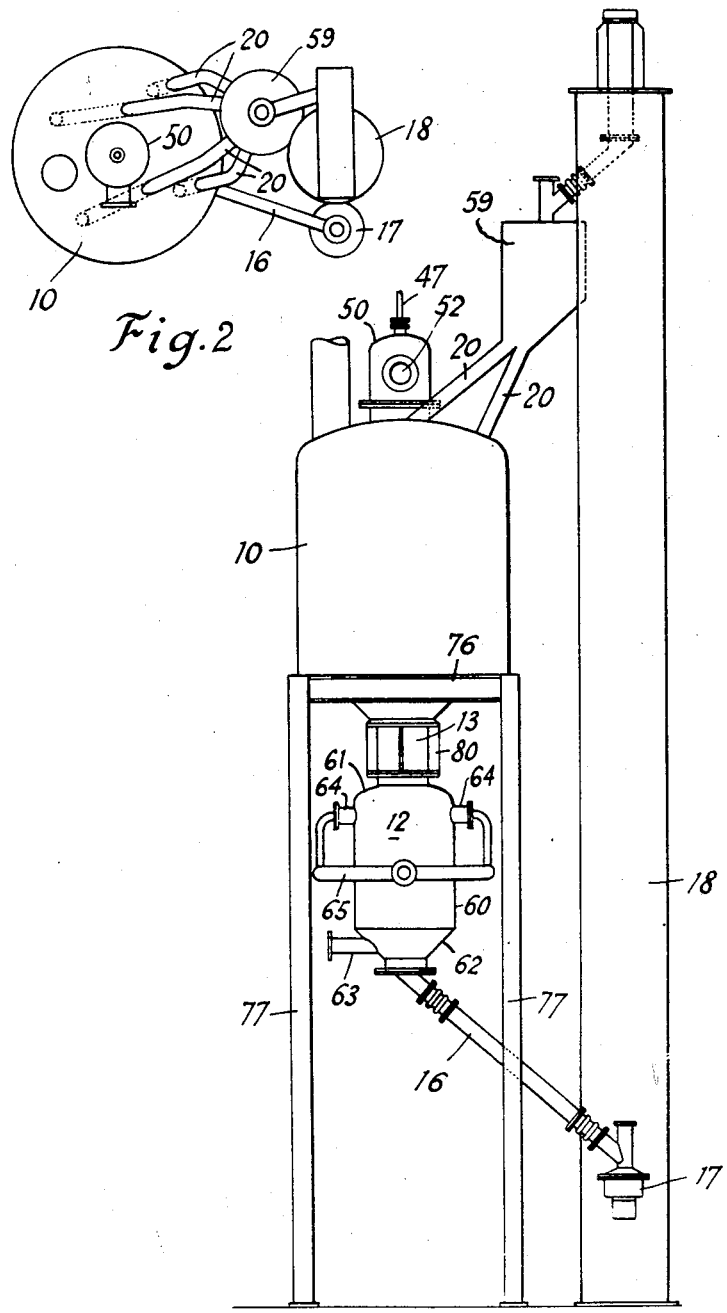

Aug. 7, 1951     P. R. GROSSMAN     2,563,323
FLUID HEATER

Filed April 1, 1949     3 Sheets-Sheet 3

INVENTOR
Paul R. Grossman
BY
J. P. Moran
ATTORNEY

Patented Aug. 7, 1951

2,563,323

UNITED STATES PATENT OFFICE 2,563,323

FLUID HEATER

Paul R. Grossman, Alliance, Ohio, assignor to The Babcock & Wilcox Company, Rockleigh, N. J., a corporation of New Jersey Application April 1, 1949, Serial No. 84,890

9 Claims. (Cl. 263—19)

The present invention relates to the construction and operation of fluid heaters of the type in which a fluent mass of gas-pervious solid heat transfer material is circulated downwardly through a heating chamber, in which it is heated by the passage of gaseous heating fluid in heat transfer relation therewith, and then through a connecting passage of reduced flow area to and through a subjacent cooling chamber, in which it is cooled by heat transfer to a second fluid to be heated. This general type of fluid heating apparatus is disclosed in the Bailey et al. Patent 2,447,306.

Fluid heaters of the type described usually employ small pieces or bodies of ceramic refractory material arranged in a solid column or bed as the heat transfer material. The bed of material is continuously circulated downwardly through superimposed refractory lined chambers connected by one or more throat conduits of reduced cross-section where the refractory construction of the fluid heater allows continuous operation of the unit over extended periods of time at substantially higher temperatures than are desirable with metallic heat exchangers. The downwardly moving mass of heat transfer material is heated in the upper chamber by direct contact countercurrent flow relationship with a heating fluid. The gaseous products resulting from the combustion of a gaseous or liquid fuel, with or without the addition of excess air for temperature regulation, forms a practical heating fluid for this purpose.

In such heaters a problem is encountered in attaining uniformity of bed temperatures transversely of the downwardly moving mass of heat transfer material. A substantially uniform transverse bed temperature is very desirable in many fluid heater installations either by reason of the nature of the fluid heated in the apparatus, or due to the physical characteristics of the heat transfer material. Uniformity of transverse bed temperatures is primarily dependent upon the uniformity of heating gas flow through the bed of heat transfer material. Uniformity of gas flow through the bed is greatly influenced by the uniformity of gas flow distribution to the bed. The difficulty in attaining uniformity of bed temperatures is increased in high capacity fluid heaters where the cross-sectional area of the bed is increased in proportion to the increase in heater capacity. One desirable arrangement of fluid heater apparatus is disclosed and claimed in a copending application of George D. Ebbets and Ralph M. Hardgrove, filed October 26, 1946, Serial No. 706,018. In the application, the heating chamber is constructed with an annular passageway for the downwardly moving bed of heat transfer material. The central portion of the chamber advantageously provides space for an internal combustion chamber or heating gas inlet, from which the heating gases radially enter the lower end portion of the annular bed and flow upwardly therethrough in an essentially uniformly distributed stream. With this type of fluid heater, the difference in fluid pressures on opposite sides of the wall separating the combustion chamber and the upper portion of the annular passageway may be sufficient to cause combustion gas leakage through the intervening wall structure, if made of ceramic material. The pressure difference, and thus the gas leakage, will increase with the depth of the bed of heat transfer material due to the correspondingly increased fluid pressure drop of fluid flow through the bed. The pressure differential will be greatest in the upper part of the heater because of the flow resistance of the bed of heat transfer material.

In accordance with the present invention, a metallic sleeve embraces the upper portion of the annular chamber wall to provide a seal against gas leakage from the combustion chamber into the upper portion of the bed passageway. Since the sleeve is exposed to a relatively high temperature, it is maintained at a safe operating temperature by fluid cooling.

The main object of the present invention is to provide a fluid heater of the type described which is characterized by a high capacity and a high heat transfer efficiency. A further and more specific object is to provide means for avoiding a leakage of high temperature heating gases through a ceramic refractory wall between zones of differential pressures. An additional specific object is to provide an inner wall refractory metallic member of the type described which is exposed to relatively high temperatures and is maintained at a safe operating temperature by fluid cooling. An additional specific object is to cool a metallic sleeve encircling a portion of an annularly arranged refractory wall in a solid and gas contact device of the type described by a flow of combustion air which is thereafter burned with a fuel in the space defined by the annular refractory wall.

The various features of novelty which characterize my invention, are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of my invention.

Of the drawings:

Fig. 1 is an elevation of a fluid heating apparatus including apparatus constructed in accordance with the present invention;

Fig. 2 is a plan view of the apparatus shown in Fig. 1;

Figures 3, 4, 5:
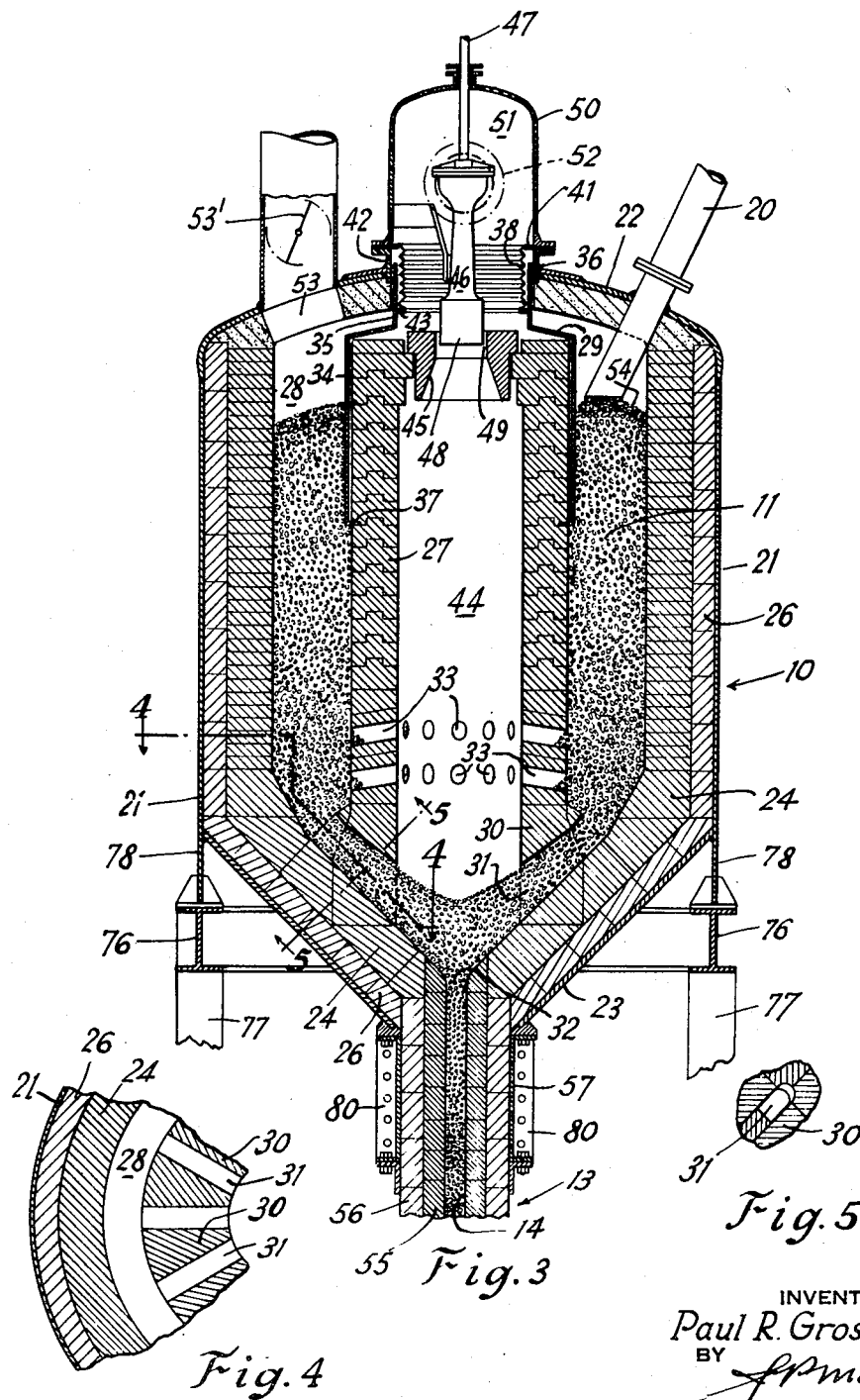
Fig. 3 is an enlarged sectional elevation of a portion of the apparatus shown in Fig. 1.
Figures 6, 7:
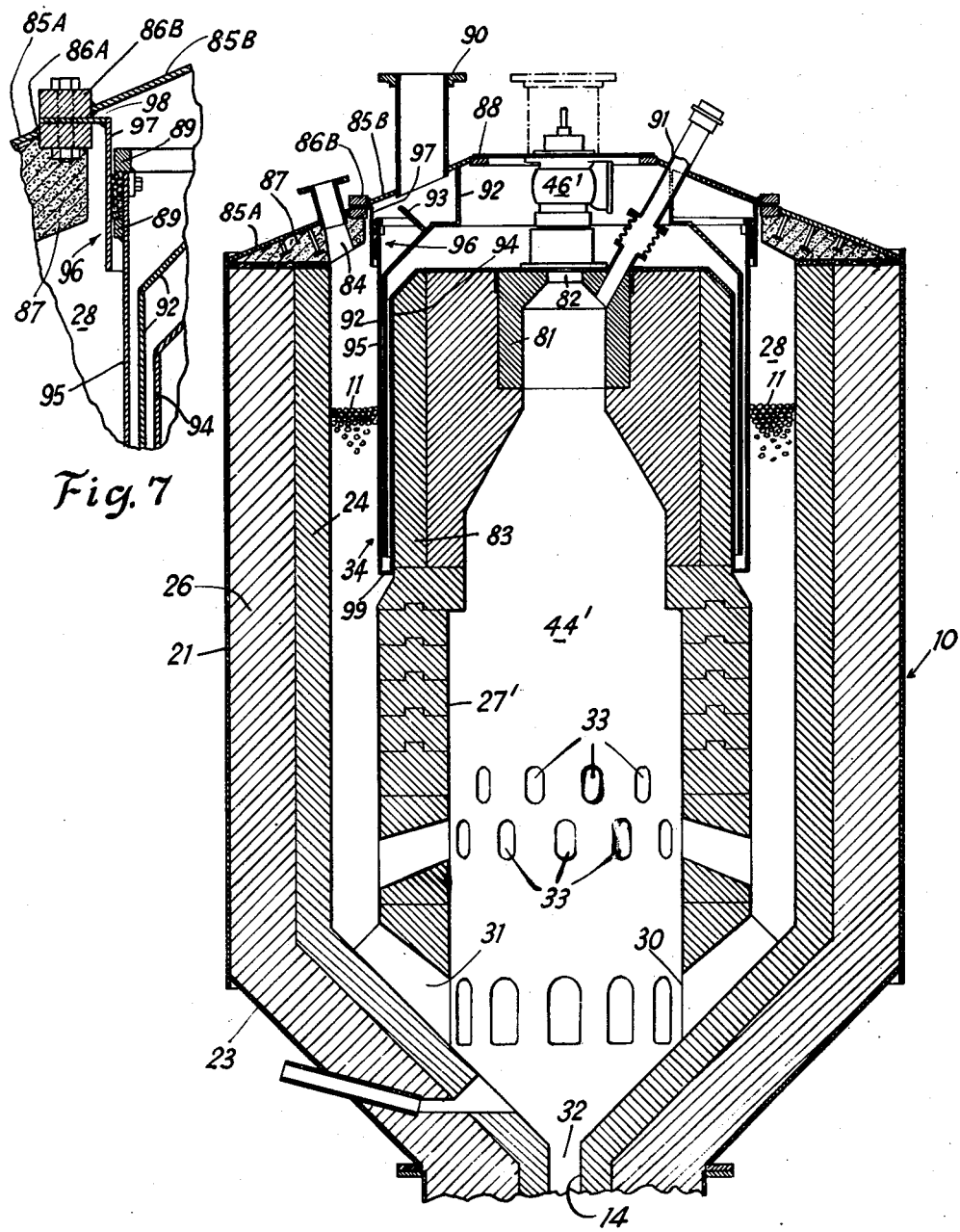

Figs. 4 and 5 are sectional views taken on lines 4—4 and 5—5 respectively of Fig. 3;

Fig. 6 is a sectional elevation of a modified construction of a portion of the apparatus shown in Fig. 1; and Fig. 7 is an enlarged sectional view of a portion of the apparatus shown in Fig. 6.

The fluid heater construction is illustrated in general in Fig. 1 and includes an upper heating chamber 10 wherein a fluent mass of solid heat transfer material 11 is heated by direct contact with a heating fluid, and a lower cooling chamber 12 wherein the heated heat transfer material 11 is cooled by direct contact with a fluid to be heated. The chambers 10 and 12 are connected by a tubular conduit 13 having an internal throat passageway 14 of substantially smaller cross-sectional flow area which forms a passageway therebetween for the flow of heat transfer material from the upper chamber to the lower chamber. In the illustrated embodiment of the invention, the heating fluid for the heat transfer material in the chamber 10 consists of gaseous products of combustion which are advantageously produced in a combustion chamber located centrally within the chamber 10. The gases being directed into direct contact counterflow relationship with the downwardly moving bed of heat transfer material for a substantially uniform flow through the interstitial spaces of the bed. The moving bed of heat transfer material is arranged with a substantial depth and an extended circumferential length. The heat transfer material is heated to a relatively high temperature during its passage through the upper chamber 10, and in passing through the lower chamber 12 its temperature is reduced by heat exchange with the fluid to be heated. The cooled heat transfer material leaves the lower chamber 12 through a discharge pipe or spout 16 connected at its lower end to a suitable mechanical feeder 17. The feeder regulates the rate of withdrawal of heat transfer material from the chamber 12 and discharges it into an elevator 18 which delivers the heat transfer material through a plurality of feed spouts 20 into the upper chamber for reuse in the heat exchange cycle process.

A relatively wide range of refractory materials can be used as the fluent mass of solid heat transfer material, the material selected depending upon the particular operating conditions to be maintained within the fluid heating unit. In general, the material should have a high strength and hardness, substantial resistance to thermal shock, and a high softening temperature. Such materials may be natural or manufactured ceramic refractories, corrosion resistant alloys or alloy steels, in small pieces or regular or irregular shape. As disclosed in said Bailey et al. patent, substantially spherical pellets or "pebbles" of manufactured ceramic refractories have been successfully used. The pellets should be a size such as to provide a large amount of surface area for transfer of heat and of a density sufficient to withstand the fluid flow velocities through the pellet mass while in the heating and cooling chambers without lifting. One desirable size of ceramic refractory pellet has been found to be approximately $\frac{7}{16}$ inch in diameter, but the size may be varied above and below that value depending upon the desired operating conditions in the fluid heater.

As shown in Figs. 3 to 5, inclusive, the upper or pellet heating chamber 10 is defined by a cylindrical metallic casing 21 having a domed top 22 and an inverted frusto-conical bottom plate 23, with all the interior surfaces thereof protected by a lining 24 of one or more layers of suitable refractory material. The lining of the domed top 22 is formed of a monolithic poured refractory material. In addition to the protective refractory lining 24, the cylindrical casing 21 and the inverted frusto-conical bottom plate 23 are protected by a layer of insulating material 26 interposed between the casing 21 and lining 24.

An upright refractory cylindrical wall 27 is centrally positioned within the chamber 10 with its outer face radially spaced from the inner face of the lining 24 to define an annular chamber or passageway 28 therebetween having a circumferential length many times greater than its transverse radial width. The wall is supported on a series of circumferentially spaced piers 30 which are in turn built into the lower conical extension of the lining 24 and supported by the inverted frusto-conical bottom plate 23. As shown in Fig. 3, the spaced piers define a series of inwardly flaring inclined openings 31 therebetween, whereby the heat transfer material 11 can flow freely from the annular passageway 28 to a centrally positioned outlet 32 forming the entrance to the throat passageway 14. The wall 27 is constructed with one or more rows of circumferentially spaced ports 33 radially extending through the wall and inclined downwardly toward their outer ends so that, with the natural angle of repose of the heat transfer material, the material will not extend very far into the ports. The wall 27 extends upwardly to a spaced position near the top 22.

In accordance with my invention, the upper portion of the wall 27 is provided with a supporting metallic sleeve 34. The sleeve 34 extends from a location intermediate the height of the wall 27 to the upper end thereof where the sleeve is provided with a frusto-conical disk 29, and an attached cylindrical extension 35 of reduced diameter which is arranged to project upwardly through a corresponding centrally located opening 36 through the domed top. As shown, the lower end of the sleeve 34 has an internal flange 37 embedded in the wall 27, while its upper end is provided with a flexible bellows seal connection 38 arranged to permit differential expansion and contraction of the wall 27 relative to the other portions of the chamber 10, as caused by differential temperature changes, while simultaneously maintaining an effective fluid seal for the upper portion of the passage 28.

The flexible bellows 38 is a section of corrugated steel plate arranged to permit axial elongation and contraction. The upper edge of the bellows is attached to an annular plate 41 which is bolted to a rigid flanged collar 42 welded to the domed top 22 and surrounding the opening 36 in the top of the chamber. Th lower edge of the bellows 38 is attached to an inwardly projecting flange 43 within the cylindrical sleeve extension 35. With this construction the upper portion of wall 27 may expand vertically with respect to the top 22, and the cylindrical extension 35 through the opening 36 will aid in maintaining the axial alignment of the wall 27 with respect to the opening while maintaining a gastight connection between the upper portion of the annular passageway 28 and the corresponding portion of the combustion chamber 44 enclosed by the annular wall 27.

A ported burner block 45 is arranged in the upper end of the combustion chamber 44 and through which a fuel burner 46 discharges. The burner 46 is of the pre-mixing type wherein a gaseous fuel, such as natural gas or the like, is delivered through a supply conduit 47 and mixed with a portion of the required combustion air in the body of the burner 46 and the mixture discharged from the burner tip 48 through the central circular port of the block 45. The upper end of the burner is enclosed by a metallic bell-like dome 50 which is attached to the flange of collar 42 and defines an air chamber 51 into which combustion air is delivered under pressure through an inlet 52. A portion of the air delivered to the air chamber 51 discharges through an annular opening 49 between the burner tip 48 and the block, and mixes with the combustible mixture of fuel and air discharged from the burner tip. An additional portion of combustion air will pass through the annular space between the sleeve 34 and the adjacent surface of the wall 27 with an appreciable cooling effect on the metallic sleeve 34 to subsequently enter the chamber 44 by leakage through the intervening refractories. The internal chamber 44 provides a combustion space which is of sufficient cross-sectional area and length to permit substantially complete combustion of the fuel before the resultant gases escape through the ports 33 into the lower portion of the annular passageway 28.

The annular chamber or passageway 28 receives the heat transfer material pellets 11 from a plurality of spouts 20 which are arranged to project through the top 22 and to end at spaced positions in the upper portion of passageway 28. In the operation of the fluid heating apparatus, the chambers 10 and 12 are filled with the heat transfer material up to the level determined by the lower end of the spouts 20. Additional heat transfer material is maintained within the reservoir 59 so that the spouts 20 are filled and as the material 11 is circulated through the apparatus there will always be a sufficient supply to maintain the depth of material within the chamber 10 substantially uniform. With the chamber 10 proportions generally as shown and the outside diameter thereof approximately 8 feet, I have found that four spouts 20, as shown in Fig. 2, and with the heat transfer material previously described (i. e. $\tfrac{7}{8}$" diameter pellets having a natural angle of repose of approximately 20°) the circumferential variation in the depth of pellet bed between the ports 33 and the upper surface 54 thereof is insufficient to adversely effect the uniformity of heating gas flow through the heat transfer material in the passageway 28. When the diameter and/or width of the annular passageway 28 is increased beyond that indicated, it is desirable to increase the number of spouts delivering heat transfer material thereto so as to maintain an essentially even distribution of heating gas flow circumferentially of the passageway to advantageously maintain a uniformity of pellet temperature entering the chamber 12.

The annular space in the upper end of the passageway 28, above the surface 54 of the heat transfer material, is provided with stack outlet 53 containing a control damper 53' for the disposal of spent heating gases. The movement of heating gases upwardly through the interstices of the heat transfer material mass from the level of the ports 33 will be substantially uniform throughout the extent of the annular mass and as a result, the temperature of any segment in a horizontal cross-section of the annular mass will be substantially equal to every other segment.

The fluid heating apparatus, including the chambers 10 and 12 and the connecting throat 13 are supported as a unit from structural steel work located adjacent the inverted frusto-conical bottom of the upper chamber 10. This is shown particularly in Fig. 3, wherein a framework of heavy I-beams 76 on the columns 77 are affixed to the joint between the vertical sides of the upper chamber casing 21 and the upper end of the frusto-conical bottom plate 23 by web members 78. The plate 23 supporting the bottom of the upper chamber is heavier than the corresponding sections of the casings 21 and 60 for either the upper or lower chambers and due to its inverted conical shape has a high structural strength. The sectional casing 57 for the throat 13 is reinforced by angle iron stiffeners 80 to provide rigidity for the throat 13, and sufficient structural strength to support the lower chamber 12. With this construction the upper chamber 10 is free to expand upwardly from the level of tht I-beams 76, and likewise the throat 13 and the lower chamber 12 are free to expand downwardly from this same fixed level.

A modified construction of the sealing sleeve in the upper heating chamber 10 is illustrated in Figs. 6 and 7. As shown, the lower portion of the chamber, with its connection to the throat 13, and the exterior side construction is similar to the showing of Figs. 3–5, while the arrangement of the metallic sleeve encircling the upper portion of the annular wall defining tht combustion chamber 44' includes additional advantageous features. The chamber 10 in Fig. 6 is defined by a cylindrical metallic casing 21 with an inverted frusto-conical bottom plate 23. The casing and bottom plate are protected by a refractory lining 24 backed by a layer of insulating material 26.

The upright cylindrical wall 27' is radially spaced from the inner face of the lining 24 to define the annular passageway 28 therebetween. A series of circumferentially spaced piers 30 supporting the wall 27' are in turn supported on the bottom plate 23. A series of openings 31 are provided between the piers for the movement of heat transfer material from the passageway 28 to the centrally positioned outlet 32, and thence into the throat 13. The lower portion of the wall 27' is also provided with two rows of circumferentially spaced ports 33 arranged for the passage of heating gases from the chamber 44' into the mass of material 11 passing downwardly through the annular passageway 28.

A refractory burner block 81 is positioned in the upper portion of the wall 27'. The block 81 is provided with a centrally positioned port opening 82 at the top to receive fuel and air discharged by a burner 46'. The internal surface of the burner block is formed with an outwardly flaring portion intermediate its height, while its exterior surface is encased in a cylindrical refractory wall portion 83. The block and wall 83 are encircled by a metallic sleeve 34, as hereinafter described, which serves to laterally support the wall 27' and to provide a seal against leakage of gases from the upper portion of the combustion chamber 44' into the lower pressure zone of the upper portion of the annular passageway 28. The upper end of the block and wall terminate at a position substantially at the elevation of the upper end of the casing 21 and its protective lining 24.

The upper cover of the chamber 10 is defined by a frusto-conical top 85 which is divided into two sections 85A and 85B formed of metal plates joined by a pair of superimposed annular rings 86A and 86B positioned in general vertical alignment with the annular passageway 28. The metal plate of the lower section 85A of the top 85 is circumferentially welded to the upper end of casing 21 and protected by a cast refractory insulating material 87 provided with the openings (not shown) necessary for the accommodation of the feed spouts 20, similar to the showing of Figs. 1, 2 and 3. In addition, an opening 84 is provided for spent heating gases discharged from the annular passageway 28. The upper end of section 85A is circumferentially welded to the annular ring 86A so that the upper surface of the ring lies in a horizontal plane. This construction is particularly shown in Fig. 7.

The upper section 85B of the top 85 is circumferentially welded at its lower edge to the annular ring 86B so that the lower surface of the ring lies in a horizontal plane. The upper edge of the section 85B engages a horizontally disposed flat plate 88 which is provided with a central opening to accommodate the burner 46'. When the top 85 is assembled, the rings 86A and 86B are in substantial vertical alignment and are bolted together. An opening is provided in the section 85B to accommodate a combustion air supply connection 90, while an opening or openings in the opposite side of the section are arranged to accommodate observation port tubes or ignition tubes, such as indicated at 91. A depending metal skirt 92 is attached to the section 85B to serve as a baffle in directing the flow of combustion air to the burner. The skirt is formed with an upper cylindrical part connected with a lower cylinder of greater diameter by an annular plate and a truncated cone. A deflector plate 93 is attached to the cone of the skirt 92 and positioned adjacent the outer side of the inlet air connection 90, so as to distribute the entering air throughout the annular space between the skirt 92 and the top 85. The lower portion of the skirt is coaxial with and radially spaced between a pair of cylindrical sleeves 94 and 95, the inner of which embraces the refractory wall 83, while the outer cylindrical sleeve 95 extends upwardly to engage in a gas-tight slip joint 96 with a flanged depending cylinder 97. The flange 98 of the depending cylinder 97 is rigidly secured between the rings 86A and 86B. Two vertically spaced annular rings 89 are welded to the exterior of the sleeve 95 for a close clearance with the cylinder 97. The space between the annular rings 89 is packed with asbestos rope to form the slip joint 96 so that relative vertical movement between the cylinder and the sleeve is possible while maintaining a gas-tight fitting therebetween. With the construction described, the combustion air entering through the connection 90 is distributed circumferentially of the skirt 92 to pass downwardly between the outer sleeve 95 and the skirt 92. The annular plate 99 connecting the lower ends of sleeves 94 and 95 is spaced from the lower end of skirt 92 so that the air passes upwardly in the annular space between the skirt and sleeve 94 and thence through the burner 46'. The air in its flow path is preheated for combustion purposes and cools the sleeves. The metallic parts defining the sleeves are ordinarily made of alloy steel to withstand the temperature conditions characteristic of their location.

The connecting throat 13 shown in Figs. 1 and 3 is of circular section and the passageway 14 is defined by a circular series of refractory pieces 55 extending from the outlet 32 of the inverted frusto-conical bottom to the upper end of the lower chamber 12. The refractory pieces are provided with a backing of insulating material 56 which is supported from a sectional metallic casing 57. The dimensions of the vertically elongated throat 13 are such as to provide a length sufficient, when filled with the heat transfer material 11, to restrict gas flow between the chambers 10 and 12 and yet provide a passageway diameter sufficient to permit free flow of the heat transfer material from the upper to the lower chamber. Fluid flow between the chambers can be prevented or regulated, as disclosed in said Bailey et al. patent, by controlling damper 53' in response to the pressure differential across the throat 13.

The lower chamber 12 is circular in horizontal cross-section and of substantially uniform diameter from its upper end to a downwardly tapered conical bottom. As shown in Fig. 1, the chamber 12 is encased in a metallic gas-tight casing 60 having a domed top 61 arranged to receive the throat 13 and an inverted frusto-conical bottom 62. The bottom 62 is provided with a central outlet opening for the discharge of heat transfer material into the spout 16. A feed pipe 63 for the fluid to be heated is arranged to direct a flow of that fluid into the lower portion of the chamber 12 for subsequent upward movement of the fluid through the interstices of the heat transfer mass and to be discharged at the desired temperature from the upper end of the chamber through the discharge pipes 64. The discharge pipes conduct the heated fluid from the upper end of the chamber 12 into a collecting conduit 65 for discharge to a point of use. The internal arrangement of the lower chamber 12 may be constructed as disclosed in the said Bailey et al. patent or of the type disclosed in the copending Ebbets et al. application.

In operation the mass of heat transfer material is moved through the chambers 10 and 12 and intervening throat passageway 14 by operating the feeder 17 at a substantially continuous predetermined rate which may be varied as desired to accommodate changed temperature requirements in the apparatus. Leaving the feeder, the material is elevated and returned to the upper chamber to repeat the cyclic heating and cooling thereof. Within the upper chamber the heat transfer material is heated to a substantially uniform temperature, so that upon entering the lower chamber the heat given up by that material in contacting the fluid to be heated is so distributed as to insure a substantially equalized temperature through all portions of the fluid upon its discharge through the pipes 64. By maintaining constant the flow rate, temperature and composition of the fluid to be heated upon entering the chamber 12, the flow of heated fluid discharged through the pipes 64 may also be continuously maintained substantially equal with any desired temperature regulation obtained by an alteration in the easily controlled rate of fuel delivered through the burner 46.

It will be noted that the present invention discloses the arrangement and construction of two forms of a structure used in an annular bed type of a solid and gas contact device. In both forms, the structure is in the nature of a metallic sleeve encircling the upper portion of the refractory wall between the bed of heat transfer material and the central combustion space and extending downwardly below the upper level of said bed. The metallic sleeves will effectively prevent fluid leakage through the ceramic refractory wall since fluid flow resistance through the upper portion of the wall plus the flow resistance through the bed of heat transfer material above the lower end of the sleeve will exceed the total fluid flow resistance through the desired heating gas flow path between the ports 33 and the top of the bed. The sleeves are arranged to allow vertical movement of the annular wall with respect to the remaining portions of the solid and gas contact device as resulting from temperature changes, while maintaining an effective fluid seal between opposite sides of the upper portion of the annular wall. Advantageously both of the metallic sleeves are constructed and arranged for cooling by heat exchange with the combustion air, prior to the combination of the air with fuel in the combustion space.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. Heat transfer apparatus comprising walls defining a chamber having a gas outlet in its upper end and a solid material outlet in its lower end, means for maintaining a substantially continuous flow of a gas-pervious mass of fluent solid heat transfer material downwardly through said chamber to said material outlet, a refractory fluid conduit having its discharge end submerged in and opening to said mass of solid material, a cooled metallic sleeve arranged to support a portion of said conduit, and a burner arranged to supply a combustible mixture to said conduit for generating heating gases and passing said heating gases upwardly through said descending mass of solid material.

2. Heat transfer apparatus comprising walls defining a chamber having a gas outlet in its upper end and a solid material outlet in its lower end, means for maintaining a substantially continuous flow of a gas-pervious mass of fluent solid heat transfer material downwardly through said chamber to said material outlet, a refractory fluid conduit having its discharge end submerged in and opening to said mass of solid material, a burner arranged to supply a combustible mixture to said conduit for generating heating gases and passing said heating gases upwardly through said descending mass of solid material, and a metallic sleeve arranged to embrace a portion of said conduit and to be cooled by the flow of combustion air entering said conduit.

3. A solid and gas contact device comprising a high pressure retaining metallic casing defining a vertically elongated chamber of horizontal circular cross-section with a domed top having a central opening therein and an inverted frusto-conical bottom with a central outlet opening therein, a refractory lining to said casing, an inner cylindrical refractory wall internally spaced from the cylindrical wall of said chamber, a metallic sleeve embracing the upper portion of said inner wall, a gas-tight flexible connection between said sleeve and said domed top arranged to allow axial movement of said inner cylindrical wall with respect to the opening in said domed top, a plurality of circularly spaced piers resting upon said frusto-conical chamber bottom and supporting said inner cylindrical wall, means for causing downward movement of a gas-pervious mass of fluent solid heat transfer material through the annular chamber defined by the wall of said chamber and said inner cylindrical wall, and means for heating said heat transfer material to a high temperature in said annular chamber by direct contact with gaseous products of combustion including a fuel burner arranged to discharge fuel and air at superatmospheric pressure downwardly through the central top opening into the central space defined by said inner cylindrical wall.

4. A solid and gas contact device comprising a high pressure retaining metallic casing defining a vertically elongated chamber of horizontal circular cross-section with a top having a central opening therein and an inverted frusto-conical bottom with a central outlet opening therein, a refractory lining to said casing, an inner cylindrical refractory wall internally spaced from the cylindrical wall of said chamber, a plurality of circularly spaced piers resting upon said frusto-conical chamber bottom and supporting said inner cylindrical wall, means for causing downward movement of a gas-pervious mass of fluent solid heat transfer material through the annular chamber defined by the wall of said chamber and said inner cylindrical wall, means for heating said heat transfer material to a high temperature in said annular chamber by direct contact with gaseous products of combustion including a fuel burner arranged to discharge fuel and air at superatmospheric pressure downwardly into the central space defined by said inner cylindrical wall, a pair of radially spaced metallic sleeves connected at their lower ends, the innermost of said sleeves arranged to embrace a portion of said inner wall, a gas-tight flexible connection between the outermost of said sleeves and said chamber top arranged to allow axial movement of said inner wall with respect to said top, and a depending skirt extending from said chamber top between said radially spaced sleeves to a position vertically spaced from the bottom connection of said sleeves, whereby said sleeves are cooled by a flow of combustion air passing therebetween to said burner.

5. A solid and gas contact device comprising a high pressure retaining metallic casing defining a vertically elongated chamber of horizontal circular cross-section with a domed top having a central opening therein and an inverted frusto-conical bottom with a central outlet opening therein, a refractory lining to said casing, a multiplicity of arch shaped refractory members laid in interlocking rows to define an inner refractory wall internally spaced from the cylindrical wall of said chamber, a metallic sleeve anchored in an intermediate portion of and extending in radially spaced relationship upwardly around the exterior of said inner refractory wall, a gas-tight flexible connection between said sleeve and said domed top arranged to allow axial movement of said inner cylindrical wall with respect to the opening in said domed top, a plurality of circularly spaced piers resting upon said frusto-conical chamber bottom and supporting said inner cylindrical wall, means for causing downward movement of a gas-pervious mass of fluent solid heat transfer material through the annular chamber defined by the wall of said chamber and said inner cylindrical wall, and means for heating said heat transfer material to a high temperature in said annular chamber by direct contact with gaseous products of combustion including a fuel burner arranged to discharge fuel and air at superatmospheric pressure downwardly through the central top opening into the central space defined by said inner cylindrical wall.

6. Heat exchange apparatus comprising walls defining a vertically elongated chamber of substantially uniform horizontal circular cross-section, an internal annular refractory wall of substantially uniform horizontal circular cross-section coaxial with and radially spaced from the walls of said elongated chamber, a domed top to said elongated chamber having at least one inlet opening therethrough for the introduction of a fluent solid material into the annular chamber defined by said walls and having an outlet for the escape of gas from said annular chamber, a flexible connection between said internal annular wall and said top arranged to permit differential expansion therebetween, an inverted frusto-conical bottom to said elongated chamber ending in a centrally located outlet for fluent solid material, a plurality of circumferentially spaced piers integral with said frusto-conical bottom arranged to support said annular wall and to define a circumferential series of openings for the passage of fluent solid material from said annular chamber to said centrally located outlet, a fuel burner positioned at the upper end of said elongated chamber and arranged to discharge fuel and air downwardly into a cylindrical combustion chamber defined by said annular refractory wall, means for maintaining a gas-pervious mass of fluent solid material within said annular chamber and causing a substantially uniform movement thereof therethrough, and means for introducing the gases produced in said combustion chamber into the lower portion of said mass of fluent solid material in a circumferentially distributed stream for upward flow therethrough.

7. Heat transfer apparatus comprising a ceramic refractory wall enclosure defining a vertically extending heating gas chamber, a wall enclosure encircling in spaced relationship said ceramic wall enclosure and defining a heat transfer chamber having a gas outlet from the upper portion thereof, gas flow means connecting the adjacent lower portions of said chambers, means for maintaining a flow of a gas-pervious mass of fluent solid heat transfer material downwardly through said heat transfer chamber, means for causing a flow of high temperature heating gases into said heat transfer chamber through said connecting means, said fluent solid material and to said gas outlet, and a heat resistant gas-impervious metallic sealing wall embracing the upper portion of said heating gas chamber wall enclosure and extending below the upper level of heat transfer material within said heat transfer chamber.

8. Heat transfer apparatus comprising a ceramic refractory wall enclosure defining a vertically extending heating gas chamber, a wall enclosure encircling in spaced relationship said ceramic wall enclosure and defining a heat transfer chamber having a gas outlet from the upper portion thereof, gas flow means connecting the adjacent lower portions of said chambers, means for maintaining a flow of a gas-pervious mass of fluent solid heat transfer material downwardly through said heat transfer chamber, means for causing a flow of high temperature heating gases into said heat transfer chamber through said connecting means, said fluent solid material and to said gas outlet, a heat resistant gas-impervious metallic sealing wall embracing the upper portion of said heating gas chamber wall enclosure and extending below the upper level of heat transfer material within said heat transfer chamber, and means for cooling said sealing wall by heat exchange with a cooling fluid.

9. Heat transfer apparatus comprising a ceramic refractory wall enclosure defining a vertically extending heating gas chamber, a wall enclosure encircling in spaced relationship said ceramic wall enclosure and defining a heat transfer chamber having a gas outlet from the upper portion thereof, gas flow means connecting the adjacent lower portions of said chambers, means for maintaining a flow of a gas-pervious mass of fluent solid heat transfer material downwardly through said heat transfer chamber, means for causing a flow of high temperature heating gases into said heat transfer chamber through said connecting means, said fluent solid material and to said gas outlet, a heat resistant gas impervious metallic sealing wall embracing the upper portion of said heating gas chamber wall enclosure and extending below the upper level of heat transfer material within said heat transfer chamber, and means for cooling said sealing wall by heat exchange with combustion air whereby said air is preheated before combustion within said heating gas chamber.

PAUL R. GROSSMAN.

REFERENCES CITED

The following references are of record in the file of this patent:

FOREIGN PATENTS

| Number | Country | Date |
|---|---|---|
| 242,618 | Great Britain | Sept. 23, 1926 |